United States Patent
Li et al.

(10) Patent No.: US 10,242,612 B2
(45) Date of Patent: Mar. 26, 2019

(54) ARRAY SUBSTRATES AND DISPLAY DEVICES

(71) Applicant: Shenzhen China Star Optoelectronics Technology Co., Ltd., Shenzhen, Guangdong (CN)

(72) Inventors: Qianqian Li, Guangdong (CN); Je-hao Hsu, Guangdong (CN); Chengcai Dong, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 503 days.

(21) Appl. No.: 14/906,450

(22) PCT Filed: Dec. 25, 2015

(86) PCT No.: PCT/CN2015/098970
§ 371 (c)(1),
(2) Date: Jan. 20, 2016

(87) PCT Pub. No.: WO2017/071048
PCT Pub. Date: May 4, 2017

(65) Prior Publication Data
US 2017/0236467 A1 Aug. 17, 2017

(30) Foreign Application Priority Data
Oct. 30, 2015 (CN) .......................... 2015 1 0729232

(51) Int. Cl.
G09G 3/20 (2006.01)
G02F 1/1362 (2006.01)

(52) U.S. Cl.
CPC ..... G09G 3/2092 (2013.01); G02F 1/136286 (2013.01); G09G 3/20 (2013.01);
(Continued)

(58) Field of Classification Search
CPC .................. G09G 3/2092; G09G 2320/0223
See application file for complete search history.

(56) References Cited

U.S. PATENT DOCUMENTS

| 6,850,305 B2 | 2/2005 | Hsieh et al. |
| 2005/0046620 A1 | 3/2005 | Lee et al. |

(Continued)

FOREIGN PATENT DOCUMENTS

CN 101852957 A 10/2010

*Primary Examiner* — Nitin Patel
*Assistant Examiner* — Amy Onyekaba
(74) *Attorney, Agent, or Firm* — Andrew C. Cheng

(57) ABSTRACT

A DLS array substrate and the display device thereof are disclosed. The DLS array substrate includes a substrate and at least one display pixel arranged on the substrate. The display pixel includes a plurality of first pixels and a plurality of second pixels arranged along a row direction and a column direction. The first pixel and the second pixel share the same data line but connect to different scanning lines. The first pixels and the second pixels are arranged periodically along the row direction and the column direction, and the period along the row direction or the column direction includes three or four display pixels. The period along at least the row direction or at least the column direction includes three display pixels. With such configuration, the signals delay effect regarding the DLS may be alleviated, and the bright and dark lines issue may be overcome.

8 Claims, 3 Drawing Sheets

(52) U.S. Cl.
CPC ........... *G09G 2300/0804* (2013.01); *G09G 2320/0223* (2013.01)

(56) References Cited

U.S. PATENT DOCUMENTS

| | | |
|---|---|---|
| 2008/0122783 A1 | 5/2008 | Jung et al. |
| 2008/0122876 A1 | 5/2008 | Meng et al. |
| 2013/0135183 A1* | 5/2013 | Kimura ............... H01L 27/3216 345/76 |
| 2014/0362064 A1* | 12/2014 | Kuo ..................... G09G 3/3677 345/206 |
| 2016/0131954 A1* | 5/2016 | Li ..................... G02F 1/136286 349/46 |
| 2016/0247822 A1* | 8/2016 | Chen .................... G09G 3/3266 |
| 2016/0275888 A1* | 9/2016 | Chen .................... G09G 3/3614 |
| 2016/0334684 A1* | 11/2016 | Li ..................... G02F 1/133514 |
| 2017/0229054 A1 | 8/2017 | Li et al. |

\* cited by examiner

ARRAY SUBSTRATES AND DISPLAY DEVICES

BACKGROUND OF THE INVENTION

1. Field of the Invention

The present disclosure relates to display technology, and more particularly to an DLS array substrate and the display device thereof.

2. Discussion of the Related Art

In display technology, scanning lines and data lines arranged on display devices cooperatively operate with each other to realize display functions and to switch between the image. Generally, the scanning lines are arranged horizontally, and the data lines are arranged vertically. Wherein the number of the scanning lines and the data lines are the same with the number of the rows and the columns of the sub-pixels matrix, which ensure the display control of each of the sub-pixels. However, such configuration may results in surplus data lines, and the charging period of the sub-pixels may be too long.

Basing on the conventional configuration, data line share (DLS) solution has been proposed, wherein the adjacent sub-pixel utilizes different scanning lines may share the same data line. The advantage of such solution resides in that the number of the data line may be reduced to half of the original number, and the charging period of the sub-pixels may be greatly decreased when the number of the scanning lines is increased.

When the display device displays the images, usually, the dot inversion method is adopted. That is, the polarity of the signals of two adjacent data lines are opposite to each other. At the same time, the resistance of the data line may cause the signals transmitted thereon delay. As such, the signals are not of ideal square wave, and the pixels charged later may have better charging performance. Although DLS may resolve the issues, such as surplus data lines and long charging period of the sub-pixels, but this solution may accelerate the signals delay. Even, dark and bright lines may occur in the display images so as to affect the display performance.

SUMMARY

The object of the invention is to provide an DLS array substrate and the display device thereof to alleviate the signals delay effect.

In one aspect, a data line share (DLS) array substrate includes: a substrate and at least one display pixel arranged on the substrate, the display pixel includes a plurality of first pixels and a plurality of second pixels arranged along a row direction and a column direction, the first pixel and the second pixel share the same data line but connect to different scanning lines; and the first pixels and the second pixels are arranged periodically along the row direction and the column direction, and the period along the row direction or the column direction includes three or four display pixels, and the period along at least the row direction or at least the column direction includes three display pixels.

Wherein the periods along the row direction and along the column direction includes three display pixels.

Wherein along at least one of the row direction and the column direction, the display pixel of the first row includes the second pixel and two first pixels adjacent to the second pixels; the display pixel of the second row includes the first pixel and two second pixels, and the first pixel is arranged between the two second pixels; and the display pixel of the third row includes the first pixel and two second pixels adjacent to the first pixel, and the first pixel of the third row is in different column from the first pixel of the first row.

Wherein with respect to the two adjacent periods along a horizontal direction, a first scanning line and a second scanning line are respectively arranged at a top side and a down side of the display pixels of the first row, the period of the first row includes the first pixel, the first pixel, the second pixel, the first pixel, the first pixel, and the second pixel, the first pixels are controlled by the first scanning line via a switch to connect with the corresponding data line, the second pixels are controlled by the second scanning line via one switch to connect with the corresponding data line; wherein a first data line, a second data line, a third data line, and a fourth data line are arranged along the column direction, in the first row, the first pixel in the first column utilizes the first data line, the first pixel in the second column and the second pixel in the third column share the second data line, the first pixel in the fourth column and the second pixel in the sixth column share the third data line, and the first pixel in the fifth column utilize the fourth data line; a third scanning line and a fourth scanning line are respectively arranged at a top side and a down side of the display pixels of the second row, the period of the second row includes the second pixel, the first pixel, the second pixel, the second pixel, the first pixel, and the second pixel, the first pixels are controlled by the third scanning line via the switch to connect with the corresponding data line, and the second pixels are controlled by the fourth scanning line via the switch to connect with the corresponding data line; a fifth scanning line and a sixth scanning line are respectively arranged at a top side and a down side of the display pixels of the third row, the period of the third row includes the second pixel, the second pixel, the first pixel, the second pixel, the second pixel, and the first pixel, the first pixels are controlled by the fifth scanning line via one switch to connect with corresponding data lines, and the second pixels are controlled by the sixth scanning line via one switch to connect with corresponding data lines; and in the third row, the second pixel of the first column utilizes the first data line, the second pixel of the second column and the first pixel of the third column share the second data line, the second pixel of the fourth column and the first pixel of the sixth column share the third data line, and the second pixel of the fifth column utilizes the fourth data line.

Wherein the switch is a thin film transistor (TFT).

Wherein the switch is a N-type TFT.

Wherein the periods along the row direction and along the column direction respectively includes three display pixels and four display pixels.

Wherein the periods along the row direction and along the column direction respectively includes four display pixels and three display pixels.

In another aspect, a display device includes: a DLS array substrate including: a substrate and at least one display pixel arranged on the substrate, the display pixel includes a plurality of first pixels and a plurality of second pixels arranged along a row direction and a column direction, the first pixel and the second pixel share the same data line but connect to different scanning lines; and the first pixels and the second pixels are arranged periodically along the row direction and the column direction, and the period along the row direction or the column direction includes three or four display pixels, and the period along at least the row direction or at least the column direction includes three display pixels.

Wherein the periods along the row direction and along the column direction includes three display pixels.

Wherein along at least one of the row direction and the column direction, the display pixel of the first row includes the second pixel and two first pixels adjacent to the second pixels; the display pixel of the second row includes the first pixel and two second pixels, and the first pixel is arranged between the two second pixels; and the display pixel of the third row includes the first pixel and two second pixels adjacent to the first pixel, and the first pixel of the third row is in different column from the first pixel of the first row.

Wherein: with respect to the two adjacent periods along a horizontal direction, a first scanning line and a second scanning line are respectively arranged at a top side and a down side of the display pixels of the first row, the period of the first row includes the first pixel, the first pixel, the second pixel, the first pixel, the first pixel, and the second pixel, the first pixels are controlled by the first scanning line via a switch to connect with the corresponding data line, the second pixels are controlled by the second scanning line via one switch to connect with the corresponding data line; wherein a first data line, a second data line, a third data line, and a fourth data line are arranged along the column direction, in the first row, the first pixel in the first column utilizes the first data line, the first pixel in the second column and the second pixel in the third column share the second data line, the first pixel in the fourth column and the second pixel in the sixth column share the third data line, and the first pixel in the fifth column utilize the fourth data line; a third scanning line and a fourth scanning line are respectively arranged at a top side and a down side of the display pixels of the second row, the period of the second row includes the second pixel, the first pixel, the second pixel, the second pixel, the first pixel, and the second pixel, the first pixels are controlled by the third scanning line via the switch to connect with the corresponding data line, and the second pixels are controlled by the fourth scanning line via the switch to connect with the corresponding data line; a fifth scanning line and a sixth scanning line are respectively arranged at a top side and a down side of the display pixels of the third row, the period of the third row includes the second pixel, the second pixel, the first pixel, the second pixel, the second pixel, and the first pixel, the first pixels are controlled by the fifth scanning line via one switch to connect with corresponding data lines, and the second pixels are controlled by the sixth scanning line via one switch to connect with corresponding data lines; and in the third row, the second pixel of the first column utilizes the first data line, the second pixel of the second column and the first pixel of the third column share the second data line, the second pixel of the fourth column and the first pixel of the sixth column share the third data line, and the second pixel of the fifth column utilizes the fourth data line.

Wherein the switch is a thin film transistor (TFT).

Wherein the switch is a N-type TFT.

Wherein the periods along the row direction and along the column direction respectively includes three display pixels and four display pixels.

Wherein the periods along the row direction and along the column direction respectively includes four display pixels and three display pixels.

In view of the above, the locations of the first pixels and the second pixel sharing the same data line are configured such that the periods along the row direction or along the column direction may include three or four first or second pixels. The first pixels and the second pixels are distributed within a smaller period, and the distribution of the first pixels and the second pixels may be more uniform. In this way, the bright and dark lines issue resulting from the signals delay effect may be alleviated.

DETAILED DESCRIPTION OF THE EMBODIMENTS

Embodiments of the invention will now be described more fully hereinafter with reference to the accompanying drawings, in which embodiments of the invention are shown.

Figure 1:
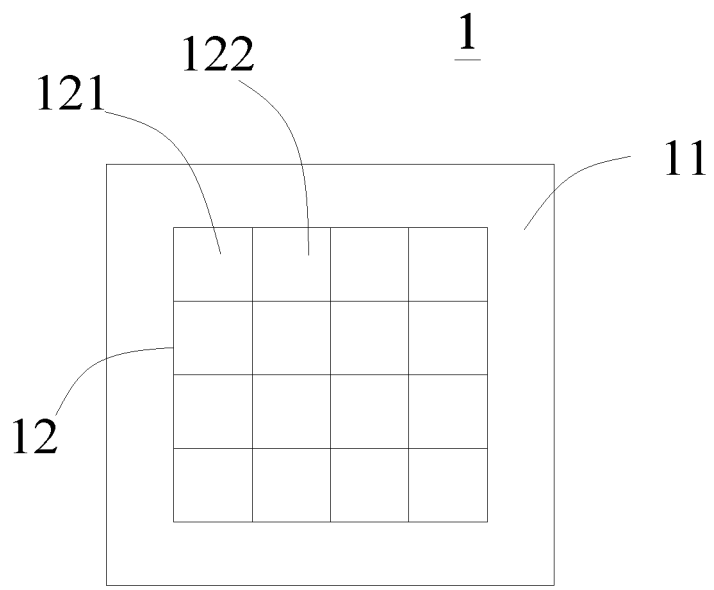
FIG. 1 is a schematic view of the DLS array substrate in accordance with one embodiment.

Referring to FIG. 1, the array substrate 1 includes a substrate 11 and at least one display pixel 12. The display pixel 12 includes a plurality of first pixels 121 and a plurality of second pixels 122 arranged in rows and columns. The first pixel 121 and the second pixel 122 are two display pixels sharing the same data line but connecting to different scanning lines. The first pixels 121 and the second pixels 122 are periodically arranged along the row direction and the along the column direction. The period along the row direction and along the column direction includes three or four display pixels. At the same time, at least along the row direction or the column direction, the period includes three display pixels along at least the row direction or the column direction.

As stated, the first pixel 121 and the second pixel 122 share the same data line, but connect to different scanning line, which means that one of the pixel is a brighter pixel, and the other pixel is a darker pixel. Also, the first pixels and the second pixels are arranged periodically along the row direction and the column direction. The period along the row direction and along the column direction includes three or four display pixels, and along at least the row direction or the column direction, the period includes three display pixels. With such configuration, the row or the column includes at least one first pixel 121 or at least one second pixel 122. The first pixel 121 and the second pixel 122 are arranged to be interleaved with each other such that the first pixel 121 and the second pixel 122 are arranged in a more distributed manner. In this way, the signals delay effect regarding the DLS may be alleviated, and the bright and dark lines issue may be overcome.

Figure 2:
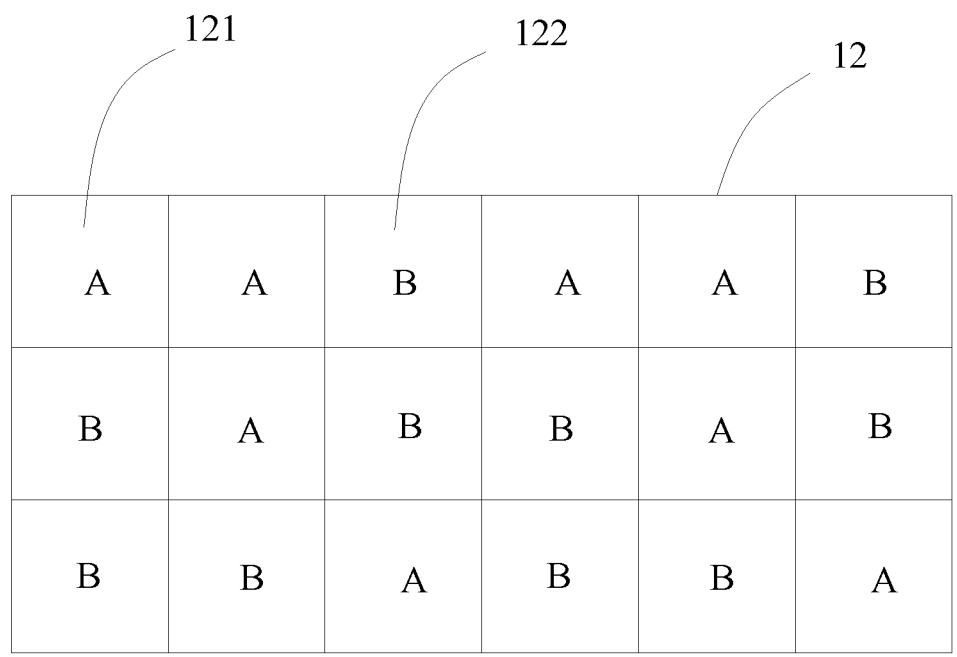
FIG. 2 is a schematic view of one example of the DLS array substrate in accordance with one embodiment.

Further, the periods of the display pixel 12, along the column direction or along the row direction, include three display pixels. Referring to FIG. 2, along at least one of the row direction and the column direction, the display pixel of the first row includes a second pixel and two first pixels, the first pixel is arranged between the two second pixels, the display pixel of the second row includes a first pixel and two second pixels adjacent to the first pixel, the display pixel of the third row includes a first pixel and two second pixels adjacent to the first pixel, and the first pixel of the third row is in different column from the first pixel of the first row.

Figure 3:
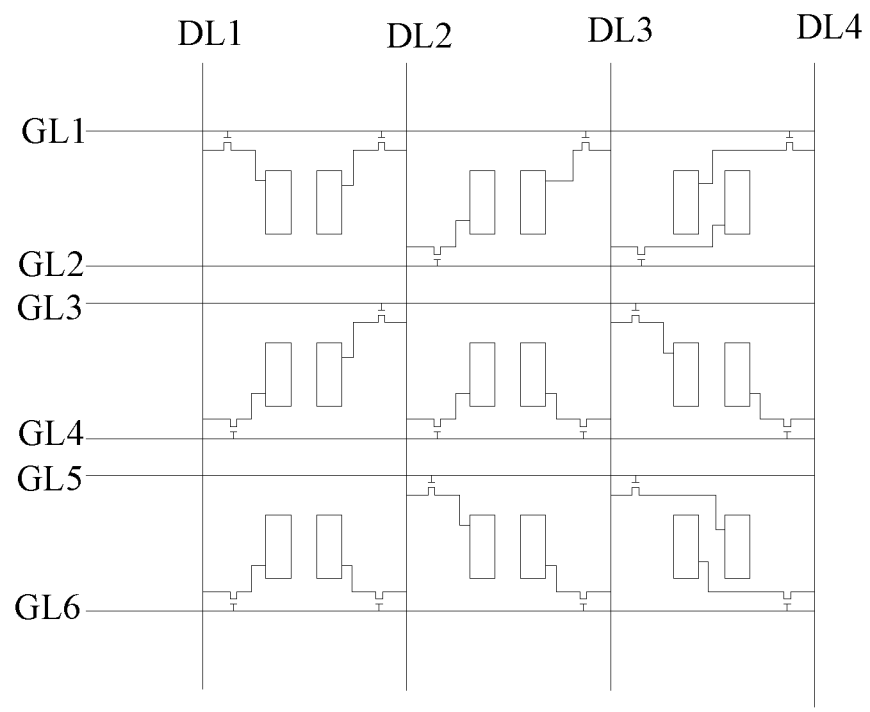
FIG. 3 is a schematic view of the circuit of FIG. 2.

Referring to FIGS. 2 and 3, with respect to the two adjacent periods along the horizontal direction, a first scanning line (GL1) and a second scanning line (GL2) are respectively arranged at a top side and a down side of the display pixels of the first row. In addition, the period of the first row includes the first pixel, the first pixel, the second pixel, the first pixel, the first pixel, and the second pixel. The first pixels are controlled by the first scanning line (GL1) via a switch to connect with the corresponding data line, the second pixels are controlled by the second scanning line (GL2) via one switch to connect with the corresponding data line.

The first data line (DL1), the second data line (DL2), the third data line (DL3), and the fourth data line (DL4) are arranged along the column direction. In the first row, the first pixel in the first column utilizes the first data line (DL1), the first pixel in the second column and the second pixel in the third column share the second data line (DL2), the first pixel in the fourth column and the second pixel in the sixth column share the third data line (DL3), and the first pixel in the fifth column utilize the fourth data line (DL4).

A third scanning line (GL3) and a fourth scanning line (GL4) are respectively arranged at a top side and a down side of the display pixels of the second row. The period of the second row includes the second pixel, the first pixel, the second pixel, the second pixel, the first pixel, and the first pixel. The first pixels are controlled by the third scanning line (GL3) via the switch to connect with the corresponding data line, and the second pixels are controlled by the fourth scanning line (GL4) via the switch to connect with the corresponding data line. Within the second row, the second pixel of the first column utilizes the first data line (DL1), the first pixel of the second column and the second pixel of the third column share the second data line (DL2), the second pixel of the fourth column and the first pixel of the fifth column share the third data line (DL3), and the second pixel of the sixth column utilizes the fourth data line (DL4).

A fifth scanning line (GL5) and a sixth scanning line (GL6) are respectively arranged at a top side and a down side of the display pixels of the third row. The period of the third row includes the second pixel, the second pixel, the first pixel, the second pixel, the second pixel, and the first pixel. The first pixels are controlled by the fifth scanning line (GL5) via one switch to connect with corresponding data lines, and the second pixels are controlled by the sixth scanning line (GL6) via one switch to connect with corresponding data lines.

In the third row, the second pixel of the first column utilizes the first data line (DL1), the second pixel of the second column and the first pixel of the third column share the second data line (DL2), the second pixel of the fourth column and the first pixel of the sixth column share the third data line (DL3), and the second pixel of the fifth column utilizes the fourth data line (DL4).

The switch may be a thin film transistor (TFT), which is energy-saving and may be easily integrated. In one example, the switch may a N-type TFT.

Figure 4:
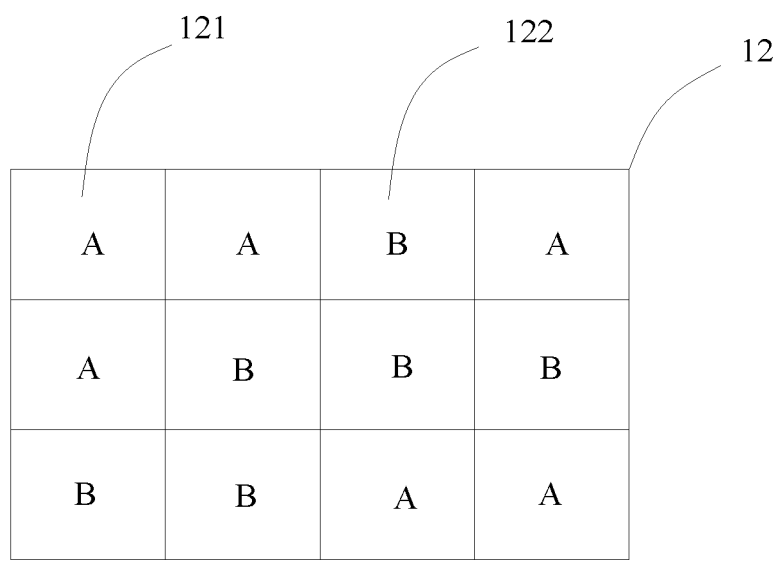
FIG. 4 is a schematic view of the DLS array substrate in accordance with another embodiment.

Referring to FIG. 4, the periods along the row direction and along the column direction respectively include three display pixels and four display pixels. Any one of the rows or the columns includes at least one first pixel 121 or the second pixel 122. The first pixels 121 and the second pixels 122 are arranged in a distributed manner along the row direction and along the column direction.

Figure 5:
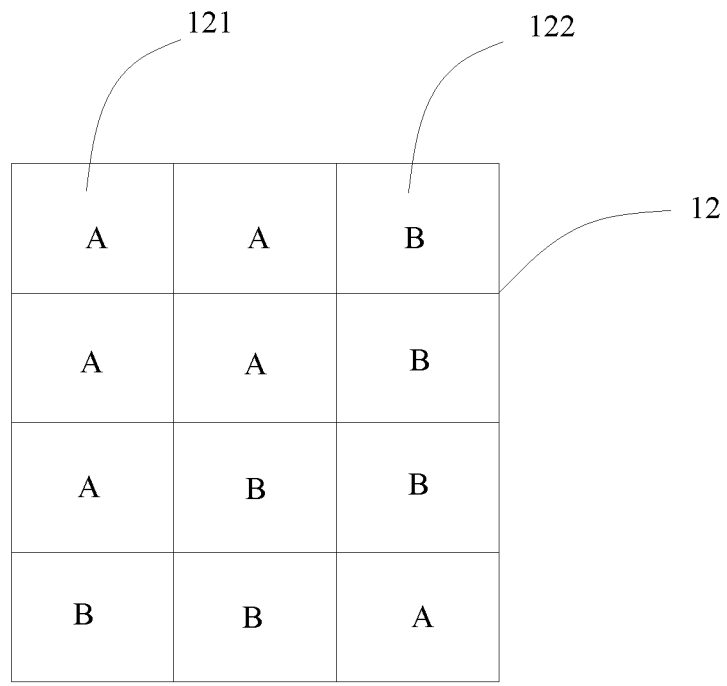
FIG. 5 is a schematic view of another example of the DLS array substrate in accordance with one embodiment.

Referring to FIG. 5, the periods along the row direction and along the column direction respectively include four display pixels and three display pixels. Any one of the rows or the columns includes at least one first pixel 121 or the second pixel 122. The first pixels 121 and the second pixels 122 are arranged in a distributed manner along the row direction and along the column direction.

Figure 6:
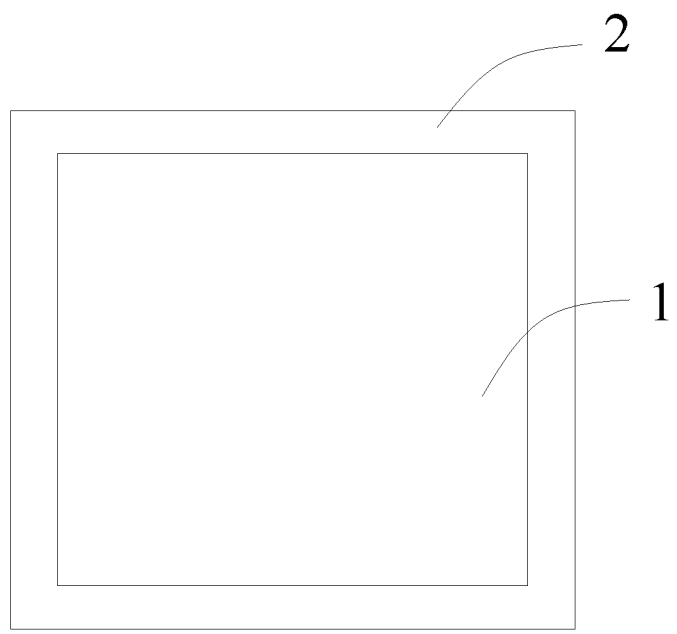
FIG. 6 is a schematic view of the DLS array substrate in accordance with another embodiment.

FIG. 6 is a schematic view of the DLS array substrate in accordance with another embodiment. The display device 2 includes the DFS array substrate 1 that may alleviate the signals delay effect so as to reduce the bright and dark lines issue. By adopting the array substrate 1, the display performance is good, wherein the bright and dark pixels are uniformly distributed, and the dark and brightness may not be easily observed so as to obtain better display performance.

In view of the above, the locations of the first pixels and the second pixel sharing the same data line are configured to be within a smaller period. The first pixels and the second pixels are arranged in a more distributed manner. In this way, the density of the bright pixels or the dark pixels is reduced, and the bright and dark lines issue resulting from the signals delay effect may be alleviated.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An array substrate, comprising: a substrate and at least four display pixels arranged on the substrate, the at least four display pixels comprises a plurality of first sub-pixels and a plurality of second sub-pixels arranged along a row direction and a column direction, at least one of the plurality of first sub-pixels and an adjacent second sub-pixel of the plurality of second sub-pixels share a same data line but connect to different scanning lines; and
   the plurality of first sub-pixels and the plurality of second sub-pixels are arranged periodically along the row direction and the column direction; a first period along the row direction comprises three display pixels, a second period along the column direction comprises three display pixels; wherein along the row direction: a first row comprises one of the plurality of second sub-pixels and two of the plurality of first sub-pixels adjacent to the one of the plurality of second sub-pixel of the first row; a second row comprises one of the plurality of first sub-pixels and two of the plurality of second sub-pixels, and the one of the plurality of first sub-pixel of the second row is arranged between the two of the plurality of second sub-pixels of the second row; and a third row comprises one of the plurality of first sub-pixels and two of the plurality of second sub-pixels adjacent to the one of the plurality of first sub-pixel, and the one of the plurality of first sub-pixel of the third row is in different column from the one of the plurality of first sub-pixel of the first row.

2. The array substrate as claimed in claim 1, wherein with respect to two adjacent periods along the row direction, a first scanning line and a second scanning line are respectively arranged at a top side and a down side of the first row, display pixels in a period of the first row are arranged in a sequence of a first sub-pixel, a first sub-pixel, a second sub-pixel, a first sub-pixel, a first sub-pixel, and a second sub-pixel, each first sub-pixels of the first row are controlled by the first scanning line via a corresponding switch to connect with a corresponding data line, each second sub-pixels of the first row are controlled by the second scanning line via a corresponding switch to connect with a corresponding data line; wherein a first data line, a second data line, a third data line, and a fourth data line are arranged along the column direction, in the first row, a first sub-pixels of the plurality of first sub-pixels in a first column utilizes the first data line, a first sub-pixels of the plurality of first sub-pixels in a second column and a second sub-pixels of the plurality of second sub-pixels in a third column share the second data line, a first sub-pixel of the plurality of first sub-pixels in a fourth column and a second sub-pixel of the plurality of second sub-pixels in a sixth column share the third data line, and a first sub-pixels of the plurality of first sub-pixels in a fifth column utilize the fourth data line; a third scanning line and a fourth scanning line are respectively arranged at a top side and a down side of the second row, display pixels in a period of the second row are arranged in a sequence of a second sub-pixel, a first sub-pixel, a second sub-pixel, a second sub-pixel, a first sub-pixel, and a second sub-pixel, each first sub-pixels of the second row are controlled by the third scanning line via a corresponding switch to connect with a corresponding data line, and each second sub-pixels of the second row are controlled by the fourth scanning line via a corresponding switch to connect with a corresponding data line; a fifth scanning line and a sixth scanning line are respectively arranged at a top side and a down side of the third row, the display pixels in a period of the third row are arranged in a sequence of a second sub-pixel, a second sub-pixel, a first sub-pixel, a second sub-pixel, a second sub-pixel, and a first sub-pixel, each first sub-pixels of the third row are controlled by the fifth scanning line via a corresponding switch to connect with corresponding data lines, and each second sub-pixels of the third row are controlled by the sixth scanning line via a corresponding switch to connect with corresponding data lines; and in the third row, a second sub-pixel of the plurality of second sub-pixels of the first column utilizes the first data line, a second sub-pixel of the plurality of second sub-pixels of the second column and a first sub-pixel of the plurality of first sub-pixels of the third column share the second data line, a second sub-pixel of the plurality of second sub-pixels of the fourth column and a first sub-pixels of the plurality of first sub-pixels of the sixth column share the third data line, and a second sub-pixels of the plurality of second sub-pixels of the fifth column utilizes the fourth data line.

3. The array substrate as claimed in claim 2, wherein the switch is a thin film transistor (TFT).

4. The array substrate as claimed in claim 3, wherein the switch is an N-type TFT.

5. A display device, comprising: an array substrate comprising: a substrate and at least four display pixels arranged on the substrate, the at least four display pixels comprises a plurality of first sub-pixels and a plurality of second sub-pixels arranged along a row direction and a column direction, at least one of the plurality of first sub-pixels and an adjacent second sub-pixel of the plurality of second sub-pixels share a same data line but connect to different scanning lines; and the plurality of first sub-pixels and the plurality of second sub-pixels are arranged periodically along the row direction and the column direction; a first period along the row direction comprises three display pixels, a second period along the column direction comprises three display pixels, wherein along the row direction; a first row comprises one of the plurality of second sub-pixels and two of the plurality of first sub-pixels adjacent to the one of the plurality of second sub-pixel of the first row; a second row comprises one of the plurality of first sub-pixels and two of the plurality of second sub-pixels, and the one of the plurality of first sub-pixel of the second row is arranged between the two of the plurality of second sub-pixels of the second row; and a third row comprises one of the plurality of first sub-pixels and two of the plurality of second sub-pixels adjacent to the one of the plurality of first sub-pixel, and the one of the plurality of first sub-pixel of the third row is in different column from the one of the plurality of first sub-pixel of the first row.

6. The display device as claimed in claim 5, wherein with respect to two adjacent periods along the row direction, a first scanning line and a second scanning line are respectively arranged at a top side and a down side of the first row, display pixels in a period of the first row are arranged in a sequence of a first sub-pixel, a first sub-pixel, a second sub-pixel, a first sub-pixel, a first sub-pixel, and a second sub-pixel, each first sub-pixels of the first row are controlled by the first scanning line via a corresponding switch to connect with a corresponding data line, each second sub-pixels of the first row are controlled by the second scanning line via a corresponding switch to connect with a corresponding data line; wherein a first data line, a second data line, a third data line, and a fourth data line are arranged along the column direction, in the first row, a first sub-pixels of the plurality of first sub-pixels in a first column utilizes the first data line, a first sub-pixel of the plurality of first sub-pixels in a second column and a second sub-pixels of the plurality of second sub-pixels in a third column share the second data line, a first sub-pixel of the plurality of first sub-pixels in a fourth column and a second sub-pixel of the plurality of second sub-pixels in a sixth column share the third data line, and a first sub-pixels of the plurality of first sub-pixels in a fifth column utilize the fourth data line; a third scanning line and a fourth scanning line are respectively arranged at a top side and a down side of the second row, display pixels in a period of the second row are arranged in a sequence of a second sub-pixel, a first sub-pixel, a second sub-pixel, a second sub-pixel, a first sub-pixel, and a second sub-pixel, each first sub-pixels of the second row are controlled by the third scanning line via a corresponding switch to connect with a corresponding data line, and each second sub-pixels of the second row are controlled by the fourth scanning line via a corresponding switch to connect with a corresponding data line; a fifth scanning line and a sixth scanning line are respectively arranged at a top side and a down side of the third row, display pixels in a period of the third row are arranged in a sequence of a second sub-pixel, a second sub-pixel, a first sub-pixel, a second sub-pixel, a second sub-pixel, and a first sub-pixel, each first sub-pixels of the third row are controlled by the fifth scanning line via a corresponding switch to connect with corresponding data lines, and each second sub-pixels of the third row are controlled by the sixth scanning line via a corresponding switch to connect with corresponding data lines; and in the third row, a second sub-pixel of the plurality of second sub-pixels of the first column utilizes the first data line, a second sub-pixel of the plurality of second sub-pixels of the second column and a first sub-pixel of the plurality of first sub-pixels of the third column share the second data line, a second sub-pixels of the plurality of second sub-pixels of the fourth column and a first sub-pixels of the plurality of first sub-pixels of the sixth column share the third data line, and a second sub-pixels of the plurality of second sub-pixels of the fifth column utilizes the fourth data line.

7. The display device as claimed in claim 6, wherein the switch is a thin film transistor (TFT).

8. The display device as claimed in claim 7, wherein the switch is an N-type TFT.

* * * * *